United States Patent
Tiwari

(10) Patent No.: US 11,778,580 B2
(45) Date of Patent: Oct. 3, 2023

(54) DEVICE AND METHOD OF HANDLING AN INTERWORKING PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 523 days.

(21) Appl. No.: 16/102,765

(22) Filed: Aug. 14, 2018

(65) Prior Publication Data

US 2019/0053187 A1  Feb. 14, 2019

Related U.S. Application Data

(60) Provisional application No. 62/545,471, filed on Aug. 14, 2017.

(51) Int. Cl.
*H04W 60/04* (2009.01)
*H04W 76/22* (2018.01)
(Continued)

(52) U.S. Cl.
CPC ......... *H04W 60/04* (2013.01); *H04L 65/1073* (2013.01); *H04W 48/18* (2013.01);
(Continued)

(58) Field of Classification Search
CPC ..... H04W 60/04; H04W 76/22; H04W 48/18; H04W 76/12; H04W 8/02; H04W 76/10; H04L 65/1073; H04L 12/18; H04L 65/403

See application file for complete search history.

(56) References Cited

U.S. PATENT DOCUMENTS

2016/0227590 A1 * 8/2016 Huang ................. H04W 76/12
2016/0316496 A1 * 10/2016 Dannebro ............ H04W 76/12
(Continued)

FOREIGN PATENT DOCUMENTS

| WO | 2011/103982 A1 | 9/2011 | |
|---|---|---|---|
| WO | WO-2017139130 A1 * | 8/2017 | ............ H04W 60/00 |
| WO | WO-2018085187 A1 * | 5/2018 | ............ H04W 36/00 |

OTHER PUBLICATIONS

Intel, et al., S2-173339 (23.502: QoS mapping for 5GC-EPC interworking), May 15-19, 2017, SA WG2 Meeting #121, whole document (Year: 2017).*

(Continued)

*Primary Examiner* — Awet Haile
*Assistant Examiner* — Jose L Perez
(74) *Attorney, Agent, or Firm* — Winston Hsu

(57) ABSTRACT

A communication device for handling an interworking procedure comprises at least one processing circuit configured to execute instructions of registering to a fifth generation (5G) system (5GS) network and establishing at least one Protocol Data Unit (PDU) session of a PDU session type to a Data Network (DN) identified by a first Data Network Name (DNN) and connected to the 5GS network; selecting a cell of an Evolved Packet System (EPS) network, after establishing the at least one PDU session; determining whether the at least one PDU session is supported in the EPS network; determining whether the cell supports an attach without any packet data network (PDN) connection; and initiating an attach procedure on the cell, when determining that none of the at least one PDU session is supported in the cell and the cell does not support the attach without any PDN connection.

3 Claims, 7 Drawing Sheets

(51) Int. Cl.
H04L 65/1073 (2022.01)
H04W 48/18 (2009.01)
H04W 76/10 (2018.01)
H04W 76/12 (2018.01)
H04W 8/02 (2009.01)

(52) U.S. Cl.
CPC .......... H04W 76/10 (2018.02); H04W 76/12 (2018.02); H04W 76/22 (2018.02); *H04W 8/02* (2013.01)

(56) References Cited

U.S. PATENT DOCUMENTS

| | | | | |
|---|---|---|---|---|
| 2018/0020417 | A1* | 1/2018 | Catovic | H04W 48/16 |
| 2018/0352448 | A1* | 12/2018 | Ryu | H04W 8/04 |
| 2018/0376384 | A1* | 12/2018 | Youn | H04W 36/14 |
| 2018/0376444 | A1* | 12/2018 | Kim | H04W 60/04 |
| 2019/0028337 | A1* | 1/2019 | Ryu | H04W 8/02 |
| 2019/0150219 | A1* | 5/2019 | Wang | H04W 76/30 370/329 |
| 2019/0239062 | A1* | 8/2019 | Baek | H04W 8/02 |
| 2019/0289506 | A1* | 9/2019 | Park | H04W 36/0027 |
| 2019/0335413 | A1* | 10/2019 | Kawasaki | H04W 60/04 |
| 2019/0357278 | A1* | 11/2019 | Kawasaki | H04W 76/15 |
| 2020/0053615 | A1* | 2/2020 | Chiba | H04W 36/0022 |
| 2020/0068449 | A1* | 2/2020 | Jin | H04W 36/18 |
| 2020/0068481 | A1* | 2/2020 | Kim | H04W 36/14 |

OTHER PUBLICATIONS

InterDigital Inc., S2-174381, (23.501: 5G to EPC Handover without PDU session), Jun. 26-30, 2017, SA WG2 Meeting #122, whole document (Year: 2017).*

Huawei, S2-172169, (Clarification PDU session/PDN connection establishment during interworking), Mar. 27-31, 2017, SA WG2 Meeting #120, whole document (Year: 2017).*

Ericsson, S2-170804, (23.501: 5GC-EPC interworking), Feb. 13-17, 2017, SA WG2 Meeting #119, whole document (Year: 2017).*

Samsung, S2-173204 (Interworking procedure fora dual-registration UE: 5GC to EPC), May 15-19, 2017, SA WG2 Meeting #121, whole document (Year: 2017).*

NTT DOCOMO, S2-173321 (Capturing Dual Registration Procedures between EPC and 5GC), May 15-19, 2017, SA WG2 Meeting #121, whole document (Year: 2017).*

Park, et al., U.S. Appl. No. 62/419,475 (U.S. provisional application of Park et al. (US 2019/0289506 A1)), filed Nov. 9, 2016, USPTO, whole document (Year: 2016).*

Park, et al., U.S. Appl. No. 62/419,476 (U.S. provisional application of Park et al. (US 2019/0289506 A1)), filed Nov. 9, 2016, USPTO, whole document (Year: 2016).*

3GPP TS 23.501, "3rd Generation Partnership Project; Technical Specification Group Services and System Aspects; System Architecture for the 5G System; Stage 2 (Release 15)", V1.2.0, Jul. 2017, pp. 1-166.

Samsung, "Interworking procedure for a dual-registration UE: EPC to 5GC", SA WG2 Meeting #121 (S2-173205), May 15-19, 2017, Hangzhou, China, pp. 1-3.

Office action dated Mar. 20, 2019 for the Taiwan application No. 107128368, filing date Aug. 14, 2018, pp. 1-9.

3GPP TS 23.501 V1.1.0 (Jul. 2017) Technical Specification 3rd Generation Partnership Project; Technical Specification Group Services and System Aspects; System Architecture for the 5G System; Stage 2 (Release 15).

3GPP TS 24.301 V14.4.0 (Jun. 2017) Technical Specification 3rd Generation Partnership Project; Technical Specification Group Core Network and Terminals; Non-Access-Stratum (NAS) protocol for Evolved Packet System (EPS); Stage 3 (Release 14).

Search Report dated Aug. 7, 2019 for EP application No. 18188906.4, pp. 1-5.

Ericsson, "Handling of Ethernet and unstructured PDU session types when interworking with EPC (23.502)", SA WG2 Meeting #123, S2-177739 (revision of S2-177672 revS2-177027), Oct. 23-27, 2017, Ljubljana, Slovenia, XP051346592, pp. 1-9.

* cited by examiner

| PDU session type | PDN type |
|---|---|
| IPv4 is equal to | IPv4 |
| IPv6 is equal to | IPv6 |
| Unstructured is equal to | IPv4v6 |
| Ethernet is equal to | None |

DEVICE AND METHOD OF HANDLING AN INTERWORKING PROCEDURE

CROSS REFERENCE TO RELATED APPLICATIONS

This application claims the benefit of U.S. Provisional Application No. 62/545,471 filed on Aug. 14, 2017, which is incorporated herein by reference.

BACKGROUND OF THE INVENTION

1. Field of the Invention

The present invention relates to a device and a method used in a wireless communication system, and more particularly, to a device and a method of handling an interworking procedure.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling an interworking procedure to solve the abovementioned problem.

A communication device for handling an interworking procedure comprises at least one storage device; and at least one processing circuit coupled to the at least one storage device. The at least one storage device stores, and the at least one processing circuit is configured to execute instructions of: registering to a fifth generation (5G) system (5GS) network and establishing at least one Protocol Data Unit (PDU) session of a PDU session type to a Data Network (DN) identified by a first Data Network Name (DNN) and connected to the 5GS network; selecting a cell of an Evolved Packet System (EPS) network, after establishing the at least one PDU session; determining whether the at least one PDU session is supported in the EPS network; determining whether the cell supports an attach without any packet data network (PDN) connection; and initiating an attach procedure on the cell, when determining that none of the at least one PDU session is supported in the cell and the cell does not support the attach without any PDN connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
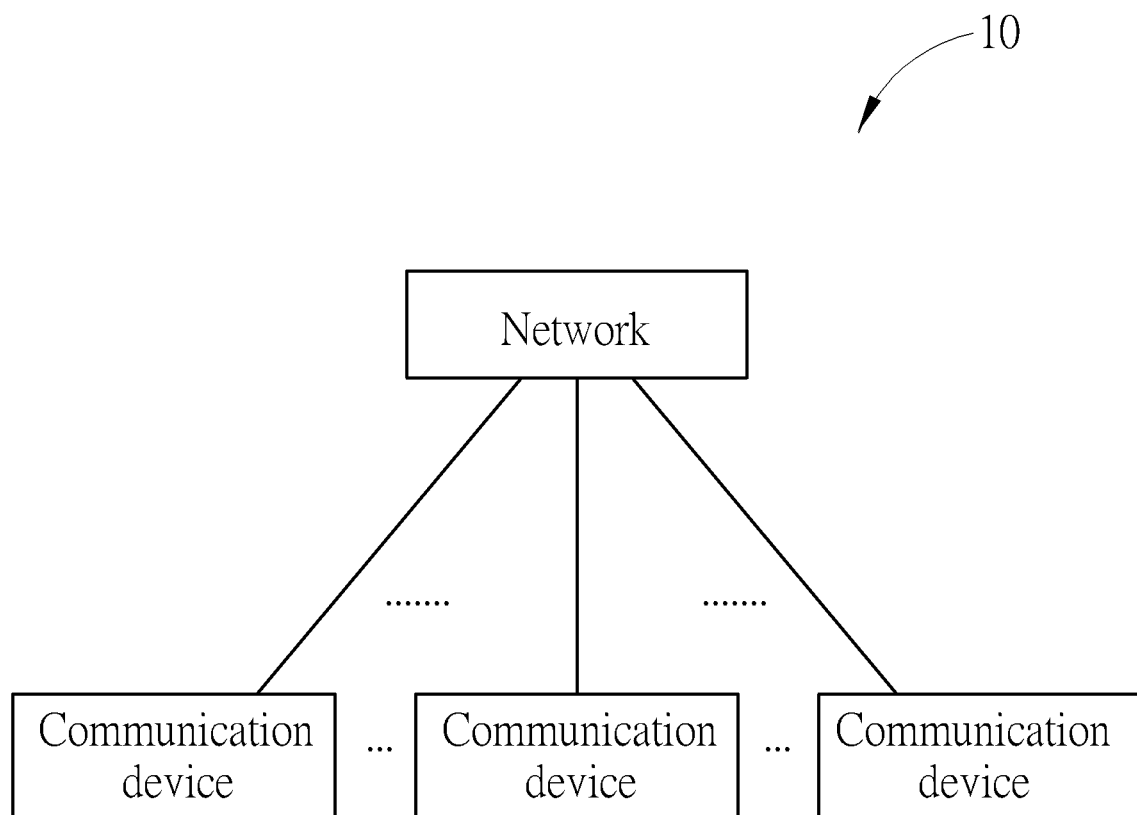
FIG. 1 is a schematic diagram of a wireless communication system according to an example of the present invention.

In FIG. 1, the wireless communication system 10 is briefly composed of a network and a plurality of communication devices. The network and a communication device may communicate with each other via one or more carriers of licensed band (s) and/or unlicensed band (s). The network and the communication device may communicate with each other via one or multiple cells (e.g., multiple carriers) including a primary cell (PCell), zero, one or more secondary cells (SCells), and zero or one primary SCell (PSCell). The abovementioned cells may be operated in the same or different frame structure types, or in the same or different duplexing modes, e.g., frequency-division duplexing (FDD) or time-division duplexing (TDD) in the same radio access technology (RAT) or different RATs. The RATs may include evolved universal terrestrial radio access (EUTRA) or fifth generation (5G) (or called New Radio (NR)). For example, the PCell may be operated on a licensed carrier, while the PSCell or the SCell may be operated on an unlicensed carrier, i.e., licensed-assisted access (LAA). In one example, the PCell may be operated on an unlicensed carrier without any licensed carrier, i.e., standalone unlicensed access (UA).

The network may include at least one base station (BS) to communicate with the communication devices. Practically, the at least one BS may include at least one evolved Node-B (eNB) or at least one 5G BS (e.g., gNB). In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
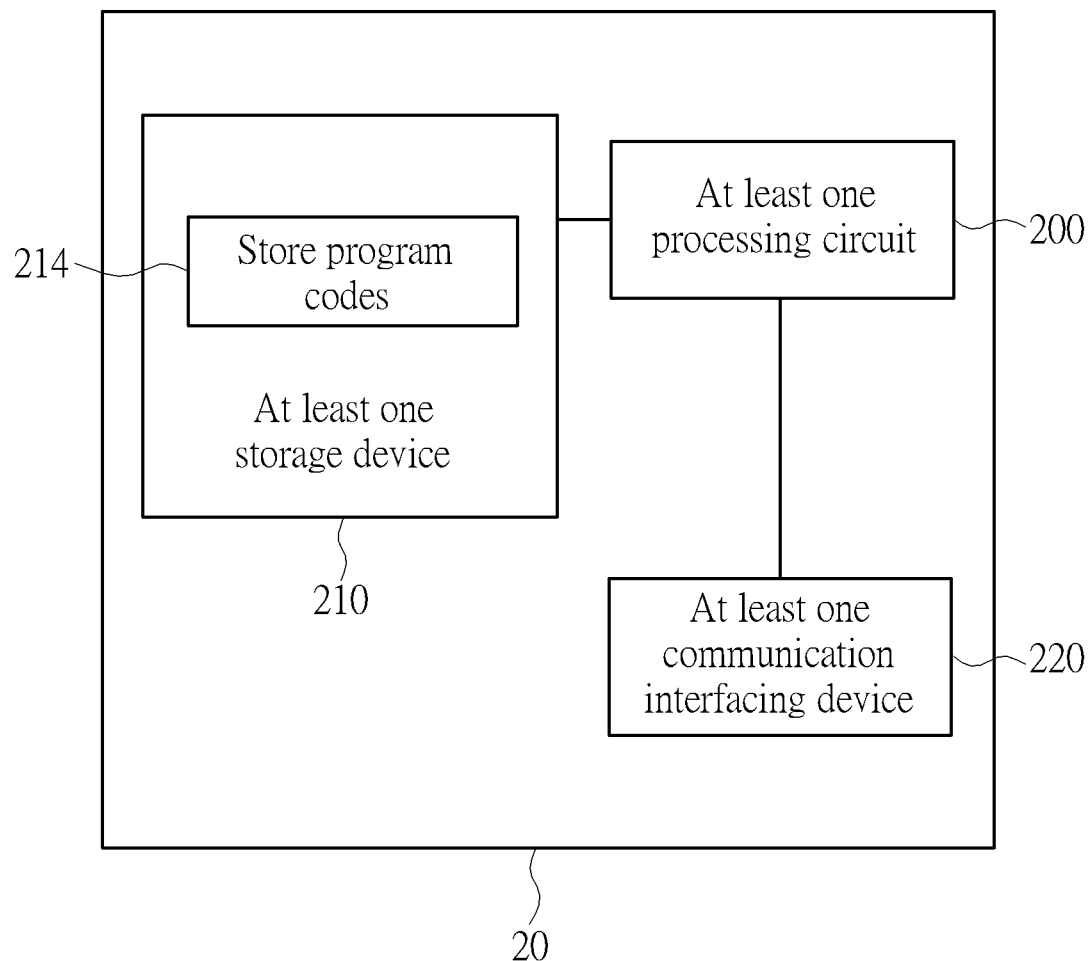
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

According to the prior art, an Ethernet protocol data unit (PDU) session type is defined in a 5G system (5GS) to support a transmission of an Ethernet frame via a PDU session. In an Evolved Packet System (EPS) system, a packet data network (PDN) connection does not support a PDN type Ethernet. If a UE or a network does not support an attach without a PDN connectivity, the UE needs to have an active PDN connection in the EPS. In this scenario, when the UE only have one PDU session which is an Ethernet type PDU session and selects a cell of the EPS system, the UE cannot attach to the EPS network since the PDN type Ethernet is not supported in the EPS system. In this case, the UE behavior is still unknown.

In a 5GS, a PDU session connected to a Local Area Data Network (LADN) is only valid in the 5GS. A service area is sent to the UE during a registration procedure. If the UE has only one PDU session connected to the LADN and selects a cell of the EPS network, it is not clear how the UE attaches to the EPS network.

Figure 3:
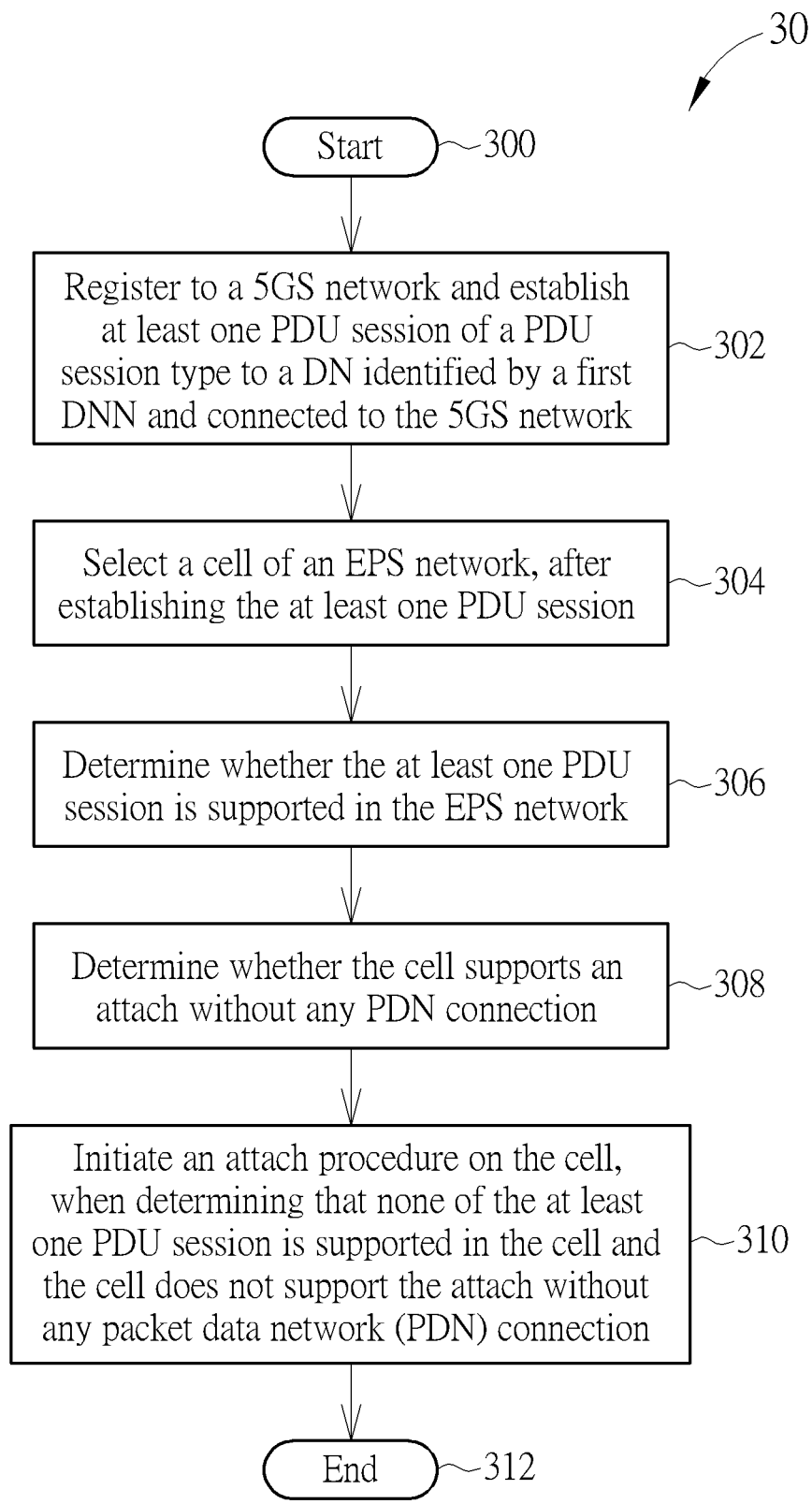
FIG. 3 is a flowchart of a process according to an example of the present invention.

A process 30 in FIG. 3 is utilized in a UE, and includes the following steps:

Step 300: Start.

Step 302: Register to a 5GS network and establish at least one PDU session of a PDU session type to a Data Network (DN) identified by a first Data Network Name (DNN) and connected to the 5GS network.

Step 304: Select a cell of an EPS network, after establishing the at least one PDU session.

Step 306: Determine whether the at least one PDU session is supported in the EPS network.

Step 308: Determine whether the cell supports an attach without any packet data network (PDN) connection.

Step 310: Initiate an attach procedure on the cell, when determining that none of the at least one PDU session is supported in the cell and the cell does not support the attach without any PDN connection.

Step 312: End.

Realization of the present invention is not limited to the process 30.

In one example, the instruction of initiating the attach procedure includes transmitting an ATTACH REQUEST message comprising a PDN Connection Request message which comprises a PDN type supported by the EPS network. In one example, the PDU session type is mapped to a PDN type in a predetermined table.

Figure 4:
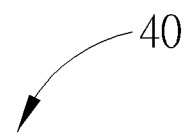
FIG. 4 is an example of a mapping table according to an example of the present invention.

FIG. 4 is an example of a mapping table 40 according to an example of the present invention. Four PDU session types are mapped to four PDN types, respectively. For example, the PDU session type "IPv6 is equal to" is mapped to the PDN type "IPv6".

In one example, the instruction of determining whether the at least one PDU session is supported in the EPS network includes checking whether at least one PDU session type of all of the at least one PDU session is defined in a PDN type of the EPS network, determining that the at least one PDU session is not supported in the EPS network if the at least one PDU session type of the all of the at least one PDU session is not defined in the PDN type of the EPS network, and determining that the at least one PDU session is supported in the EPS network if a PDU session type of one of the at least one PDU session is defined in the PDN type of the EPS network. For example, if the PDU session type of the all of the at least one PDU session is Ethernet, the UE determines that the EPS network does not support the at least one PDU session.

In one example, the instruction of determining whether the at least one PDU session is supported in the EPS network includes checking whether all of the at least one PDU session is at least one Local Area Data Network (LADN) PDU session, wherein the at least one LADN PDU session is connected to a LADN network and a second DNN of the at least one LADN PDU session is transmitted in LADN Availability Information during a registration procedure.

In one example, the instruction of determining whether the cell supports the attach without any PDN connection includes checking whether the EPS network broadcasts a support of the attach without any PDN connection in system information, and determining that the EPS network does not support the attach without any PDN connection, if the EPS network does not broadcast the support of the attach without any PDN connection.

In one example, the UE performs a tracking area update procedure, if the UE has the at least one PDU session with the PDU session type defined in a PDN type of the EPS network (e.g., the PDU session type IPv4) and the at least one PDU session with the PDU session type is not defined in the PDN type of the EPS network (e.g., the PDU session type is Ethernet).

In one example, the instruction of determining whether the at least one PDU session is supported in the EPS network includes checking whether all of the at least one PDU session is at least one LADN PDU session or at least one PDU session type of the all of the at least one PDU session is not defined in a PDN type of the EPS network, and determining that the at least one PDU session is not supported in the EPS network, if the all of the at least one PDU session is the at least one LADN PDU session or the at least one PDU session type of the all of the at least one PDU session is not defined in the PDN type of the EPS network. In one example, the at least one LADN PDU session is connected to the LADN network, and a third DNN of the LADN PDU session is sent during a registration procedure in LADN Availability Information.

Figure 5:
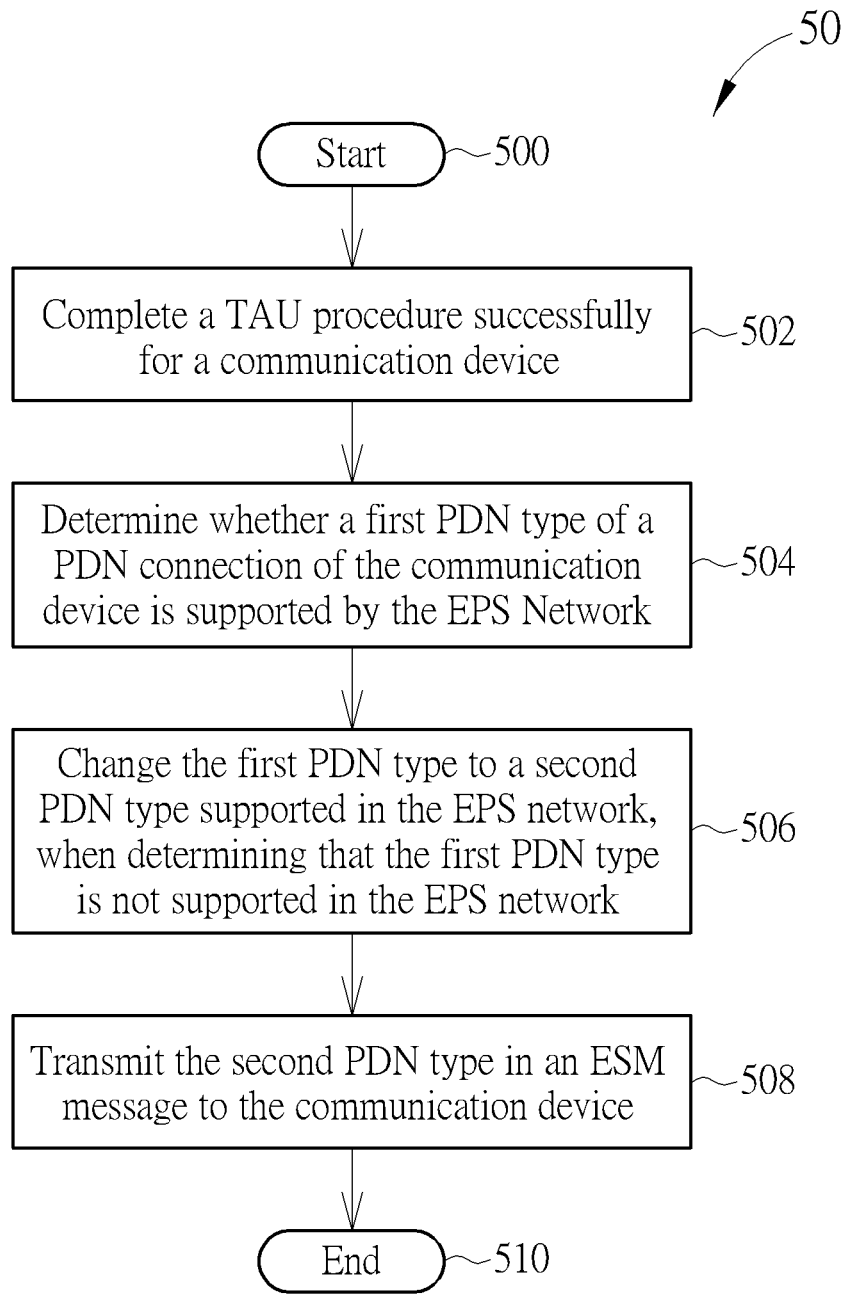
FIG. 5 is a flowchart of a process according to an example of the present invention.

A process 50 in FIG. 5 is utilized in an EPS network (e.g., the network in FIG. 1), and includes the following steps:

Step 500: Start.

Step 502: Complete a tracking area update (TAU) procedure successfully for a UE.

Step 504: Determine whether a first PDN type of a PDN connection of the UE is supported by the EPS network.

Step 506: Change the first PDN type to a second PDN type supported in the EPS network, when determining that the first PDN type is not supported in the EPS network.

Step 508: Transmit the second PDN type in an EPS Session Management (ESM) message to the UE.

Step 510: End.

Realization of the present invention is not limited to the process 50.

In one example, the instruction of determining whether the first PDN type is supported by the EPS network includes checking whether the PDN type is defined in the EPS network, determining that the PDN type is not supported if the PDN type is not defined in the EPS network then the EPS network, and determining that the PDN type is supported in the EPS network, if the PDN type is not defined in the EPS network then the EPS network.

In one example, the ESM message is an ESM status message, a MODIFY EPS BEARER CONTEXT REQUEST message or a new ESM message.

Figure 6:
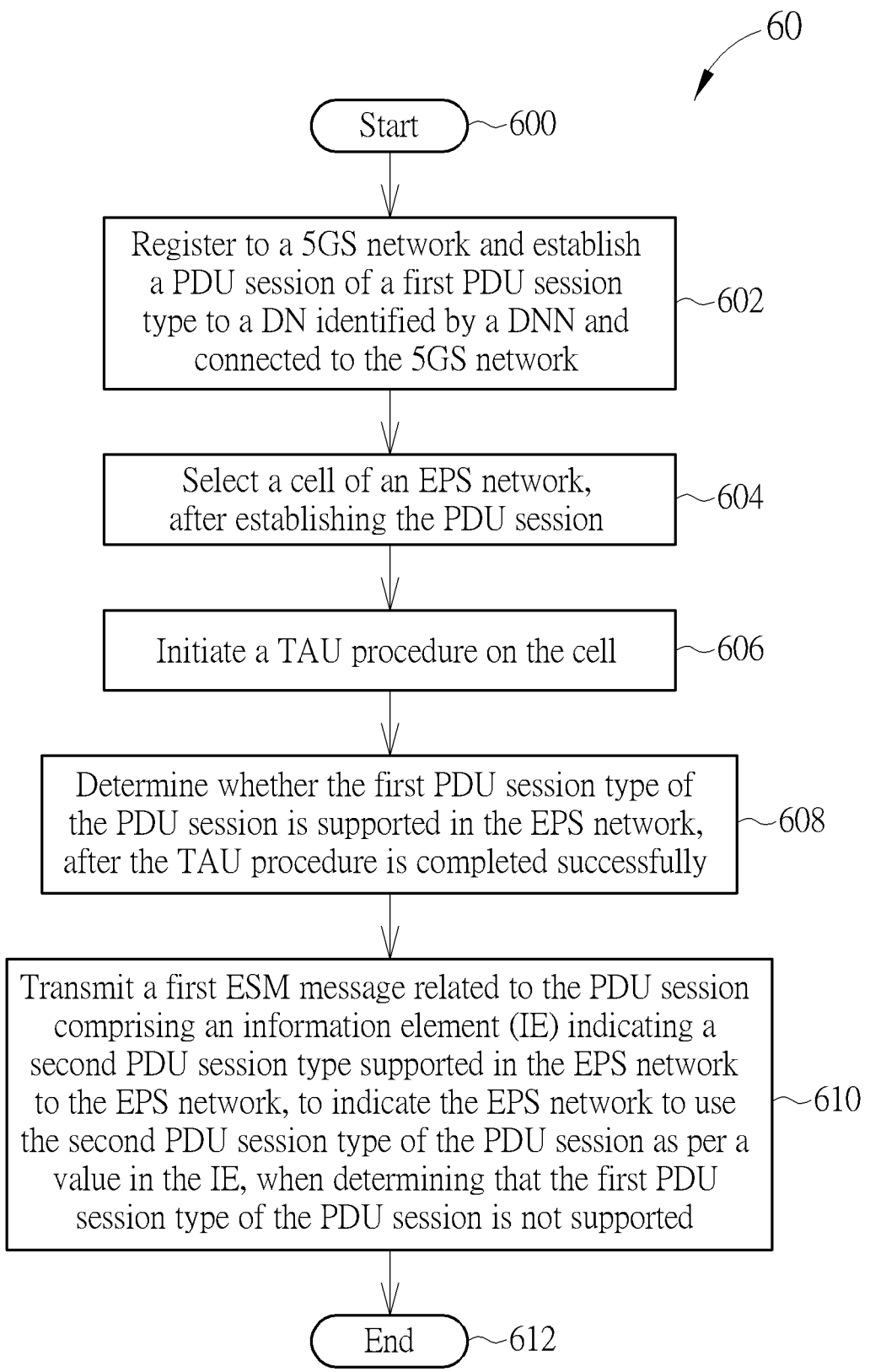
FIG. 6 is a flowchart of a process according to an example of the present invention.

A process 60 in FIG. 6 is utilized in a UE, and includes the following steps:

Step 600: Start.

Step 602: Register to a 5GS network and establish a PDU session of a first PDU session type to a DN identified by a DNN and connected to the 5GS network.

Step 604: Select a cell of an EPS network, after establishing the PDU session.

Step 606: Initiate a TAU procedure on the cell.

Step 608: Determine whether the first PDU session type of the PDU session is supported in the EPS network, after the TAU procedure is completed successfully.

Step 610: Transmit a first ESM message related to the PDU session comprising an information element (IE) indicating a second PDU session type supported in the EPS network to the EPS network, to indicate the EPS network to use the second PDU session type of the PDU session as per a value in the IE, when determining that the first PDU session type of the PDU session is not supported.

Step 612: End.

Realization of the present invention is not limited to the process 60.

In one example, the UE receives a second ESM message from the EPS network which indicates the UE that the second PDU session type of the PDU session is used successfully as per the IE in the first ESM message. In one example, the UE transmits data on the PDU session as per the second PDU session type. In one example, the first PDU session type is mapped to a PDN type in a predetermined table. An example of the predetermined table can be referred to the mapping table 40, and is not narrated herein.

In one example, the instruction of determining whether the first PDU session type of the PDU session is supported in the EPS network includes checking whether the first PDU session type is defined in the EPS network. If the first PDU session type is not defined in the EPS network, the UE determines that the first PDU session type is not supported. Otherwise, the UE determines that the first PDU session type is supported in the EPS network. For example, if the first PDU session type is Ethernet for the PDU session, the UE determines that the EPS network does not support the first PDU session type.

In one example, the first ESM message is a BEARER RESOURCE MODIFICATION REQUEST message, a BEARER RESOURCE ALLOCATION REQUEST message or an ESM STATUS message. In one example, the second PDU session type is a PDN type defined for the EPS network.

Figure 7:
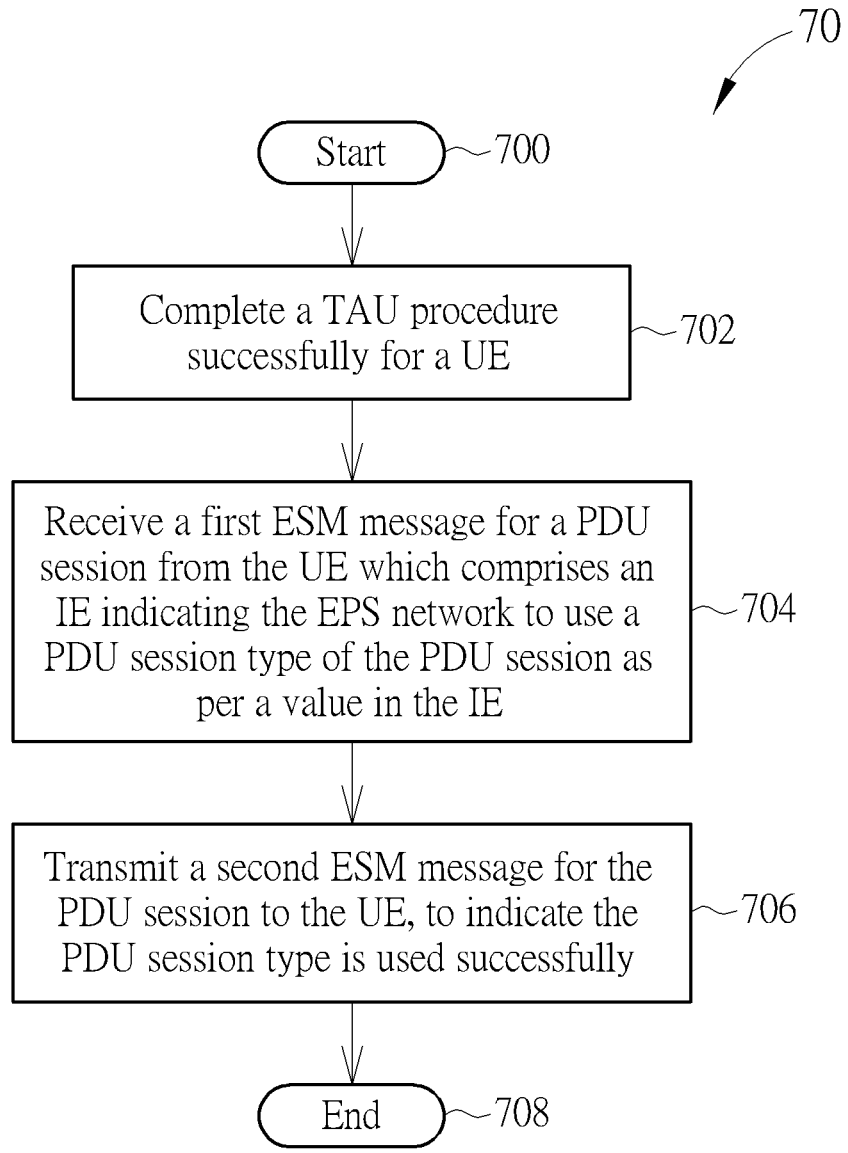
FIG. 7 is a flowchart of a process according to an example of the present invention.

A process 70 in FIG. 7 is utilized in an EPS network (e.g., the network in FIG. 1), and includes the following steps:

Step 700: Start.

Step 702: Complete a TAU procedure successfully for a UE.

Step 704: Receive a first ESM message for a PDU session from the UE which comprises an IE indicating the EPS network to use a PDU session type of the PDU session as per a value in the IE.

Step 706: Transmit a second ESM message for the PDU session to the UE, to indicate the PDU session type is used successfully.

Step 708: End.

In one example, the EPS network assigns an IP address to the PDU session, if the PDU session type is changed from Ethernet to IPv4 or IPv6.

In one example, the first ESM message is a BEARER RESOURCE MODFICATION REQUEST message, a BEARER RESOURCE ALLOCATION REQUET message, an ESM STATUS message or a New ESM message. In one example, the second ESM message is a BEARER RESOURCE MODFICATION ACCPET message, a BEARER RESOURCE ALLOCATION ACCEPT message, an ESM STATUS message or a New ESM message.

The processes 50 and 60 solves an issue that a PDU session not supported is changed to the PDU session supported in the EPS system.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above process(es) may be compiled into the program codes 214.

To sum up, the present invention provides a method and related communication device for handling an interworking procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling an interworking procedure, comprising:
   at least one storage device; and
   at least one processing circuit, coupled to the at least one storage device, wherein the at least one storage device stores, and the at least one processing circuit is configured to execute instructions of:
   registering to a fifth generation (5G) system (5GS) network and establishing Protocol Data Unit (PDU) session of a PDU session type to a Data Network (DN) identified by a first Data Network Name (DNN) and connected to the 5GS network;
   selecting a cell of an Evolved Packet System (EPS) network, after establishing the PDU session;
   determining whether the PDU session type is defined in a packet data network (PDN) type of the EPS network;
   determining whether the cell supports an attach without any PDN connection; and
   initiating an attach procedure on the cell, in response to determining that the PDU session type is not defined in the PDN type of the EPS network and the cell does not support the attach without any PDN connection;
   wherein the instruction of initiating the attach procedure comprises:
   transmitting an ATTACH REQUEST message comprising a PDN Connection Request message which comprises the PDN type of the EPS network;
   wherein the instruction of determining whether the PDU session type is defined in the PDN type of the EPS network comprises:
   checking whether the PDU session type of the PDU session is defined in the PDN type of the EPS network; and determining that the PDU session is not supported in the EPS network, in response to the PDU session type of the PDU session is not defined in the PDN type of the EPS network.

2. The communication device of claim 1, wherein the PDU session type is mapped to the PDN type in a predetermined table.

3. The communication device of claim 1, wherein the instruction of determining whether the cell supports the attach without any PDN connection comprises:
   checking whether the EPS network broadcasts a support of the attach without any PDN connection in system information; and
   determining that the EPS network does not support the attach without any PDN connection, in response to the EPS network does not broadcast the support of the attach without any PDN connection.

* * * * *